A. P. PRENDERGAST.
MECHANISM FOR VEHICLE LAMPS OR HEADLIGHTS.
APPLICATION FILED MAY 15, 1907.

942,217.

Patented Dec. 7, 1909.

UNITED STATES PATENT OFFICE.

ALOIS P. PRENDERGAST, OF BALTIMORE, MARYLAND.

MECHANISM FOR VEHICLE LAMPS OR HEADLIGHTS.

942,217.

Specification of Letters Patent.

Patented Dec. 7, 1909.

Application filed May 15, 1907. Serial No. 373,747.

*To all whom it may concern:*

Be it known that I, ALOIS P. PRENDERGAST, of Baltimore, Maryland, have invented a new and useful Improvement in Mechanism for Vehicle Lamps or Headlights, which improvement is fully set forth in the following specification.

The present invention is an improvement in mechanisms for moving the lamps or headlights of automobiles or like vehicles simultaneously with the actuation of the front wheels by the steering mechanism, so that the rays of light of the lamp or lamps will always illuminate the path to be traversed by the machine whether the same is traveling in a straight course or making a turn. Further, inasmuch as at times it is not necessary or desirable that the lamps should so move, as when the travel is by day, because such movement naturally results in considerable wear in the sockets and joints of the mechanism, means are provided for disconnecting the mechanism for actuating the lamps, and for fixedly securing the lamps to hold them relatively immovable when so disconnected.

The invention will be better understood by reference to the accompanying drawings, illustrating one embodiment of the inventive idea, and wherein—

Figure 1:
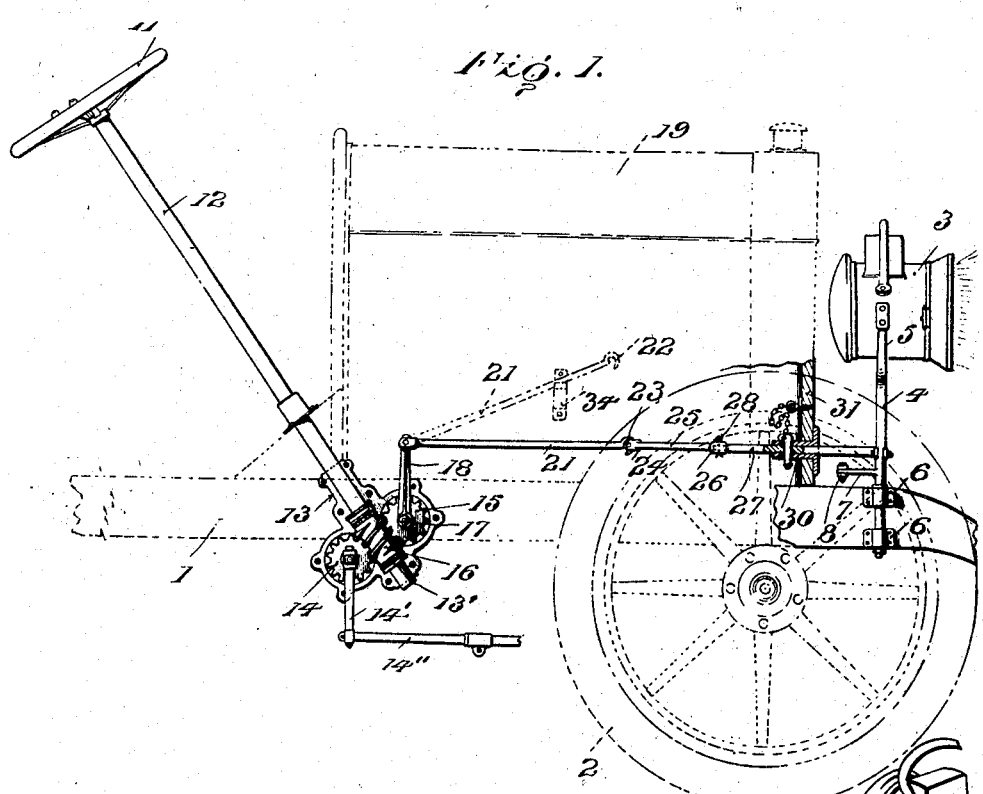
Figure 2:
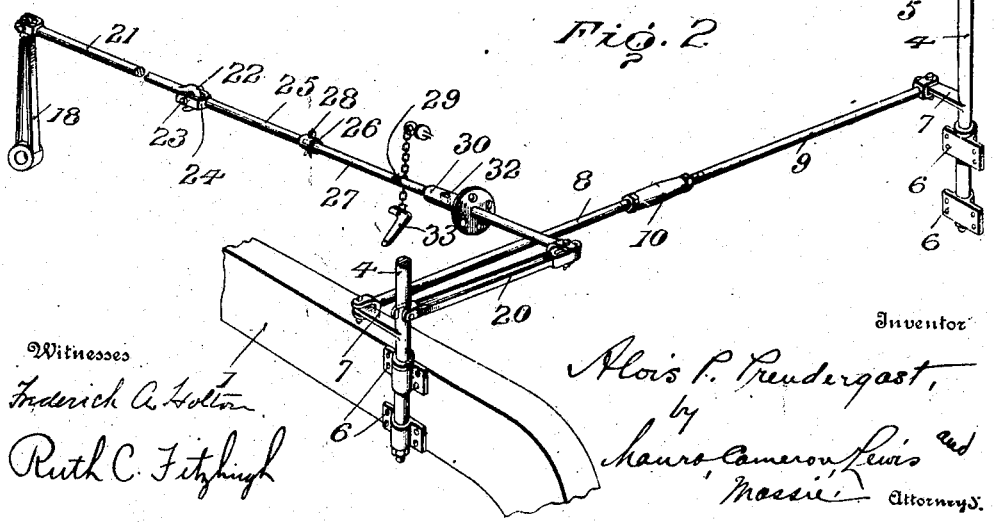

Figure 1 is an elevation, partly in section, of the front part of an automobile; and Fig. 2 is a perspective view of the improved attachment.

Referring to the drawings, 1 indicates the frame or body of the machine and 2 the usual wheels attached thereto.

The illuminating means is indicated by numeral 3, the same consisting as herein shown of a lamp arranged on either side of the machine, though, as is obvious, the invention may be employed in connection with a single lamp or headlight, centrally or otherwise positioned. Each of said lamps is mounted on a suitable support, here shown as an upright 4 provided with forks 5 between which the lamp is secured, each upright at its lower end engaging in bearing-plates 6 in which it may be revolved. Secured to each upright 4 and preferably formed integrally therewith, is an arm 7, said arms being joined by a connecting device formed of rods 8 and 9, to the end that movement imparted to one lamp shall be transmitted to the other. The outer ends of said rods 8 and 9 are pivoted to arms 7 and the inner ends thereof engage in sleeve 10, which sleeve is movable to regulate the effective length of said rods so that the lamps may be adjusted into parallelism.

The usual steering wheel 11 is secured at one end of bar 12, the outer end of which projects into casing 13 secured to the frame of the machine. Gears 14 and 15 are suitably mounted in said casing and are engaged by worm 16 arranged between said gears and secured on said bar 12, said worm being provided with thrust bearings 13'. Gear 14, crank 14' and rod 14'' constitute part of the means for effecting the angular turning of the front wheels 2, and gear 15 part of the mechanism for effecting a similar turning of the lamps 3. To shaft 17 on which said gear 15 is mounted, is fixedly secured crank arm 18 which projects up into hood 19 and which is connected to arm 20, rigidly secured to one of the uprights 4, by a suitable connecting device. This connecting device is formed in three sections, the rearmost one 21 of which is pivoted at one end to crank arm 18 and is provided at its other end with a hook 22 which engages a pin 23 of yoke 24 formed on one end of the middle section 25. The other end of this middle section 25 is supplied with a sleeve 26 into which projects one end of the foremost section 27, a pin 28 passing through adjacent ends of the two last-mentioned sections and securing them together. The front end of section 27 is provided with a pin which engages in an elongated slot in arm 20. Section 27 is provided with an opening or slot 29 and passes through a sleeve 30 secured in the front wall 31 of hood 19. Said sleeve is also provided with openings or slots 32 which are arranged to be brought into register, when desired, with slot 29 in section 27, a pin 33 then being passed through said alined openings to immobilize section 27 and, accordingly, the lamp or lamps connected thereto.

The operation of the device is as follows: When hand wheel 11 is revolved worm 16 rotates gear 14 and through suitable mechanism (not shown) effects the turning of front wheels 2 to the desired extent. Simultaneously therewith similar movement is imparted to gear 15 and, through the connections heretofore described, lamps 3 are turned concurrently with said wheels 2 and through the same angular distance. When, now, it is desired to prevent said lamps from being actuated by said steering wheel 11, and from moving angularly with the front wheels 2, hood 19 is raised, the hook of section 21 is disconnected from the pin of section 25, and the free end of said section 21 is elevated and rested on bracket 34 suitably located within the hood. As uprights 4 have a free fit in their sockets, it is necessary to prevent the same from turning and the lamps getting out of position when the lamp-actuating mechanism is disconnected, and this is effected by alining the openings in section 27 and sleeve 30 and passing pin 33 therethrough, thus effectively immobilizing the lamp or lamps. The connection between sections 25 and 27 is to permit the latter to be removed through sleeve 30 when desired, which would be impossible but for this connection, on account of the size of the yoke on section 25 and the enlarged outer end of section 27.

It will be observed that the improved device is an attachment of great simplicity which may readily be applied to any kind of vehicle, and that the movement of the lamps is not dependent upon the movement of the wheels, but that the lamp-actuating mechanism and the means for effecting the angular turning of the wheels are arranged "in parallel." This conduces to a very simple and efficient construction and one which may be rapidly adjusted should it, by chance, become disarranged.

What is claimed is:—

1. In an automobile or similar vehicle, a steering rod, a gear connected thereto and constituting part of the mechanism for steering the vehicle, a lamp, a rotatable upright on which said lamp is mounted, an arm fixed to said upright, a second gear connected to said steering rod, a crank arm secured thereto, and connections between said arms whereby said lamp is moved concurrently with the angular movement of the wheels.

2. In an automobile or similar vehicle, a steering rod, connections therebetween and the wheels for changing the angular position of the latter, a gear connected to said rod, a plurality of lamps, a rotatable upright on which each lamp is mounted, connections between said lamps, an arm fixed to one of said uprights, and connections between said gear and arm independent of said first-mentioned connections whereby said lamps are moved angularly concurrently with the angular movement of the wheels.

3. In an automobile or similar vehicle, a steering device, a plurality of lamps, a two-part connecting rod between said lamps, the two parts of said rod being adjustably connected whereby the rod may be lengthened or shortened, and connections between said steering device and one of said lamps whereby said lamps are moved angularly concurrently with the angular movement of the wheels.

4. In an automobile or similar vehicle, a steering device, a lamp, a sectional connecting rod between said steering device and lamp, means for disconnecting said sections, one of said sections being provided with a slot adapted to be alined with a slot on a fixed part of the machine, and means for engaging said alined slots to immobilize the lamp when so disconnected.

5. In an automobile or similar vehicle, a hood, a steering device, a lamp, a sectional connecting rod between said steering device and lamp, means for disconnecting said sections, a bracket for supporting one end of a section when so disconnected, a sleeve arranged in the front wall of the hood and provided with a slot adapted to be alined with a slot in one of said sections, and means for engaging said alined slots to immobilize the lamp when so disconnected.

6. In an automobile or similar vehicle, the combination of a steering rod, a worm-wheel on said rod, a gear intermeshing with said worm-wheel, connections comprising a lever and shaft therebetween and the wheels for changing the angular position of the latter, a plurality of lamps, a rotatable upright on which each lamp is mounted, connections between said lamps, an arm fixed to one of said uprights, and connections between said worm-wheel and arm, independent of said lever and shaft, whereby said lamps are moved angularly concurrently with the angular movement of the wheels.

In testimony whereof I have signed this specification in the presence of two subscribing witnesses.

ALOIS P. PRENDERGAST

Witnesses:
JOHN J. FABRENS,
WILLIAM B. KERKAM.